United States Patent
Busch et al.

(10) Patent No.: US 7,567,884 B2
(45) Date of Patent: Jul. 28, 2009

(54) METHOD AND APPARATUS FOR DETECTING THE PRESENCE OF A PRESCRIBED HEAT EXCHANGER

(75) Inventors: Michael-Rainer Busch, Ebersbach (DE); Dirk Herbstritt, Durmersheim (DE); Andreas Miksch, Stuttgart (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/594,078

(22) PCT Filed: Mar. 23, 2005

(86) PCT No.: PCT/EP2005/003095

§ 371 (c)(1),
(2), (4) Date: Jun. 19, 2007

(87) PCT Pub. No.: WO2005/093234

PCT Pub. Date: Oct. 6, 2005

(65) Prior Publication Data

US 2008/0021631 A1 Jan. 24, 2008

(30) Foreign Application Priority Data

Mar. 26, 2004 (DE) ........................ 10 2004 015 044

(51) Int. Cl.
*G01K 5/00* (2006.01)
*G01K 7/00* (2006.01)
*G01K 11/00* (2006.01)

(52) U.S. Cl. ..................................... 702/130
(58) Field of Classification Search ................ 702/130, 702/132, 134, 136; 374/144, 146
See application file for complete search history.

(56) References Cited

U.S. PATENT DOCUMENTS

| 6,437,680 | B1 | 8/2002 | Wienand et al. |
| 6,681,619 | B2 * | 1/2004 | Alleving et al. ............ 73/118.1 |
| 6,695,473 | B2 * | 2/2004 | Unger et al. ................. 374/145 |
| 2001/0039928 | A1 * | 11/2001 | Alleving et al. .......... 123/41.49 |
| 2003/0223473 | A1 * | 12/2003 | Unger et al. ................. 374/141 |

FOREIGN PATENT DOCUMENTS

| DE | 44 26 494 A1 | 2/1996 |
| DE | 199 27 108 C2 | 1/2001 |
| EP | 1 153 646 A1 | 11/2001 |
| EP | 1 367 235 A1 | 12/2003 |

OTHER PUBLICATIONS

English Abstract of DE 44 26 494, Feb. 1, 1996.*
International Search Report dated Aug. 11, 2005 including English Translation of relevant portion and PCT/ISA/237 (Ten (10) pages).

* cited by examiner

*Primary Examiner*—Michael P Nghiem
(74) *Attorney, Agent, or Firm*—Crowell & Moring LLP

(57) ABSTRACT

A method and apparatus for detecting the presence of a prescribed heat exchanger, such as a catalytically active radiator, in a motor vehicle are performed during operation of the motor vehicle. The temperature of a heat-exchanger medium is observed together with further current operationally relevant parameters of the motor vehicle for a prespecified time window. An expected temperature gradient over time of the heat-exchanger medium is detected, as well as the current temperature gradient over time of the temperature of the heat-exchanger medium. The presence of a prescribed heat exchanger is detected taking into account the expected temperature gradient and the current temperature gradient.

4 Claims, 3 Drawing Sheets

METHOD AND APPARATUS FOR DETECTING THE PRESENCE OF A PRESCRIBED HEAT EXCHANGER

BACKGROUND AND SUMMARY OF THE INVENTION

This application claims the priority of German patent document 10 2004 015 044.3, filed Mar. 26, 2004 (PCT International Application PCT/EP205/003095, filed Mar. 23, 2005), the disclosure of which is expressly incorporated by reference herein.

The invention relates to a method for detecting the presence of a prescribed heat exchanger, in particular a catalytically active radiator in a motor vehicle, and to an apparatus for this purpose which has at least one heat exchanger, at least one measuring device, and an evaluation device.

So-called catalytically active radiators are frequently provided in modern motor vehicles. A catalytically active radiator for the coolant of a vehicle motor has an additional coating which catalytically converts ozone that is present in the air which onto the vehicle and flows through the radiator, into harmless oxygen. Such catalytically active radiators are sometimes also known by the trade name "PremAir radiator™". Catalytically active radiators of this type have been developed particularly with regard to better environmental compatibility of the materials used and to avoid the undesired ozone, and therefore often satisfy the corresponding relevant environment regulations.

In many countries, the use of a catalytically active radiator in a motor vehicle is subject to special statutory regulations. In particular, tax benefits are often granted when such radiator elements are used since these radiators have a lesser effect on the environment on account of the conversion of harmful ozone into atmospheric oxygen. However, such radiator elements are relatively expensive, which often offsets the advantage of the tax saving. As a result, there is an incentive to replace the expensive radiator in the motor vehicle (which results in a tax saving), with a comparatively low-cost radiator under certain circumstances. It is therefore necessary to ensure that an installed catalytic radiator cannot be exchanged for a conventional radiator without activation of a safety unit (for example, an on-board diagnosis (OBD) system). That is, the comparatively expensive radiators should therefore be protected against adulteration and manipulation.

European patent document EP 1 153 646 A1 discloses a motor vehicle with a radiator having a catalytic coating, in which a control unit with an associated sensor system controls operation of the radiator and informs the user about the state or operation of the radiator. The sensor system also has temperature sensors at different locations in the cooling system. This publication does not, however, describe securing the radiator against manipulation, or disclose a method for detecting manipulation, for example by means of temperature sensors.

Temperature-measuring devices for cooling water also have sensors which measure the absolute temperature of the cooling water after opening of the thermostat, which guides the cooling circuit past the radiator for a certain time in the closed state after the motor is started, and through the radiator after it is opened. One disadvantage of this arrangement is that the characteristics of the thermostat change over time, and an absolute measurement of the cooling-water temperature is not suitable for detecting the installation of a catalytically active radiator as opposed to a conventional radiator.

One object on which the present invention is, therefore, is to provide a method and apparatus for detecting reliably the presence of a prescribed heat exchanger, particularly a catalytically active radiator in a motor vehicle.

This and other objects and advantages are achieved by the method according to the invention which includes the following method steps during operation of the motor vehicle:

(S1) observing the temperature of a heat-exchanger medium and at the same time observing further current operationally relevant parameters of the motor vehicle for a given time window;

(S2) detecting an expected time gradient of the temperature of the heat-exchanger medium;

(S3) detecting the current time gradient of the temperature of the heat-exchanger medium; and (S4) detecting the presence of a prescribed heat exchanger by taking into account the expected and current time gradients.

In addition, the invention also includes an apparatus for detecting the presence of a prescribed heat exchanger, in particular a catalytically active radiator in a motor vehicle, which includes:

at least one heat exchanger with a heat-exchanger medium of the motor of the motor vehicle;

at least one measuring device for measuring the temperature of the heat-exchanger medium; and an evaluation device for evaluating data and for detecting the presence of a prescribed heat exchanger.

The idea on which the present invention is based involves integrating a temperature sensor in a heat exchanger, such that the temperature sensor can be used to measure a specific absolute temperature gradient over time of the heat-exchanger medium in specific operating states of the engine. When a heat exchanger is manipulated, a different temperature gradient is measured, and an evaluation algorithm performed to draw a conclusion regarding the presence of a catalytically active radiator. This results in the following advantages:

The relevant statutory regulations regarding exhaust-gas standards and environmental protection can be satisfied by establishing the presence of a catalytically active radiator by measuring an absolute temperature gradient.

A change in the characteristics of the thermostats has no effect on the measurement result.

Manipulations can be uncovered and economic loss can be avoided.

The inventive apparatus provides further advantages:

An attempt to remove a temperature sensor from the apparatus leads to irreversible damage to the sensor.

If the temperature sensor is cut out off a catalytically active radiator which is no longer operable, or forcibly removed in some other way (since it cannot be easily removed on account of the inventive apparatus, and is fitted in the engine compartment, for example to a coolant tube or to a conventional exchange radiator), this is reliably identified by the inventive method.

The illegal installation of a conventional radiator instead of a prescribed catalytically active radiator is therefore prevented.

In one preferred embodiment, method step S1 comprises the following substeps:

(S1-1) measuring values of the temperature of the heat-exchanger medium in predefined time intervals and plotting the time profile of these values; and (S1-2) measuring values of the operationally relevant parameters at predefined time intervals and plotting the time profiles of these values.

The operating state of the motor vehicle in the time window can thus be advantageously determined.

A further refinement of the invention provides for the following the substeps in the method step S2:

(S2-1) comparing the plotted current operationally relevant parameters with predefined values;

(S2-2) determining an associated current operating state in accordance with this comparison; and (S2-3) determining the temperature gradient expected in this current operating state.

The operating states can advantageously be determined from tables by means of stored data, and it is also possible to determine the expected temperature gradient in a simple manner.

In one further embodiment, the current temperature gradient is detected in method step S3 by taking into account the current values of the temperature of the heat-exchanger medium plotted in the time window.

Method step (S4) advantageously comprises the following substeps:

(S4-1) comparing the current temperature gradient with the expected temperature gradient;

(S4-2) taking into account this comparison result with reference to a predefined threshold value; and (S4-3) transmitting data signals when a prescribed heat exchanger is present.

In a further refinement of the present invention, method step S4 comprises the following substeps:

(S4-1) comparing the current temperature gradient with the expected temperature gradient;

(S4-2) taking into account this comparison result with reference to a predefined threshold value;

(S4-3) incrementing at least one counter in accordance with the comparison result from substep (S4-2);

(S4-4) carrying out method steps (S1) to (S4-3) until a predefined counter reading is reached; and (S4-5) outputting data signals when a prescribed heat exchanger is present.

The plausibility of the measurement results can therefore be checked and the measurement results can, for example, be transmitted to a so-called on-board diagnosis system by advantageously carrying out the method more than once.

It is advantageous for another inventive embodiment to provide for the time window to be determined to begin at a first time when at least one operationally relevant parameter reaches a predefined starting threshold value, and for the time window to be determined to end at a second time when the same, or at least one further operationally relevant, parameter reaches the same or a further predefined ending threshold value.

In a further embodiment of the invention, the measuring device of the apparatus has at least one temperature sensor for measuring the temperature of the heat-exchanger medium; a holding element for holding the temperature sensor; and a connection device for connection to the evaluation device.

Furthermore, it is particularly advantageous for the holding element to be connected to the heat exchanger in a non-releasable manner, so that unauthorized removal is prevented in a simple manner.

According to another embodiment of the invention the element for holding the temperature sensor has a holder which corresponds to said temperature sensor.

It is also advantageous for the temperature sensor to have a predetermined breaking point, and to be connected to the holding element such that it is rendered permanently inoperable after it has been removed from the holding element.

The temperature sensor is expediently a constituent part of an adapter of the connection device in this case.

It is particularly advantageous for the adapter and the holding element to have corresponding fastening elements which are designed such that they cannot be released following assembly, since this provides an additional way of preventing manipulation.

In a further embodiment of the invention, the evaluation device has a memory device for storing values of time profiles of measured values, a data memory for storing predefined threshold values, operating state data and the like, and at least one counter.

The evaluation device is advantageously a constituent part of an on-board computer (ECU) of a motor vehicle.

The method allows a reliable conclusion to be drawn regarding the positioning of the temperature sensor and therefore whether a catalytically active radiator is present, by measuring the temperature gradient in a predefined value range. In addition, the inventive apparatus provides advantageous ways of preventing manipulations.

Other objects, advantages and novel features of the present invention will become apparent from the following detailed description of the invention when considered in conjunction with the accompanying drawings.

DETAILED DESCRIPTION OF THE DRAWINGS

Figure 1:
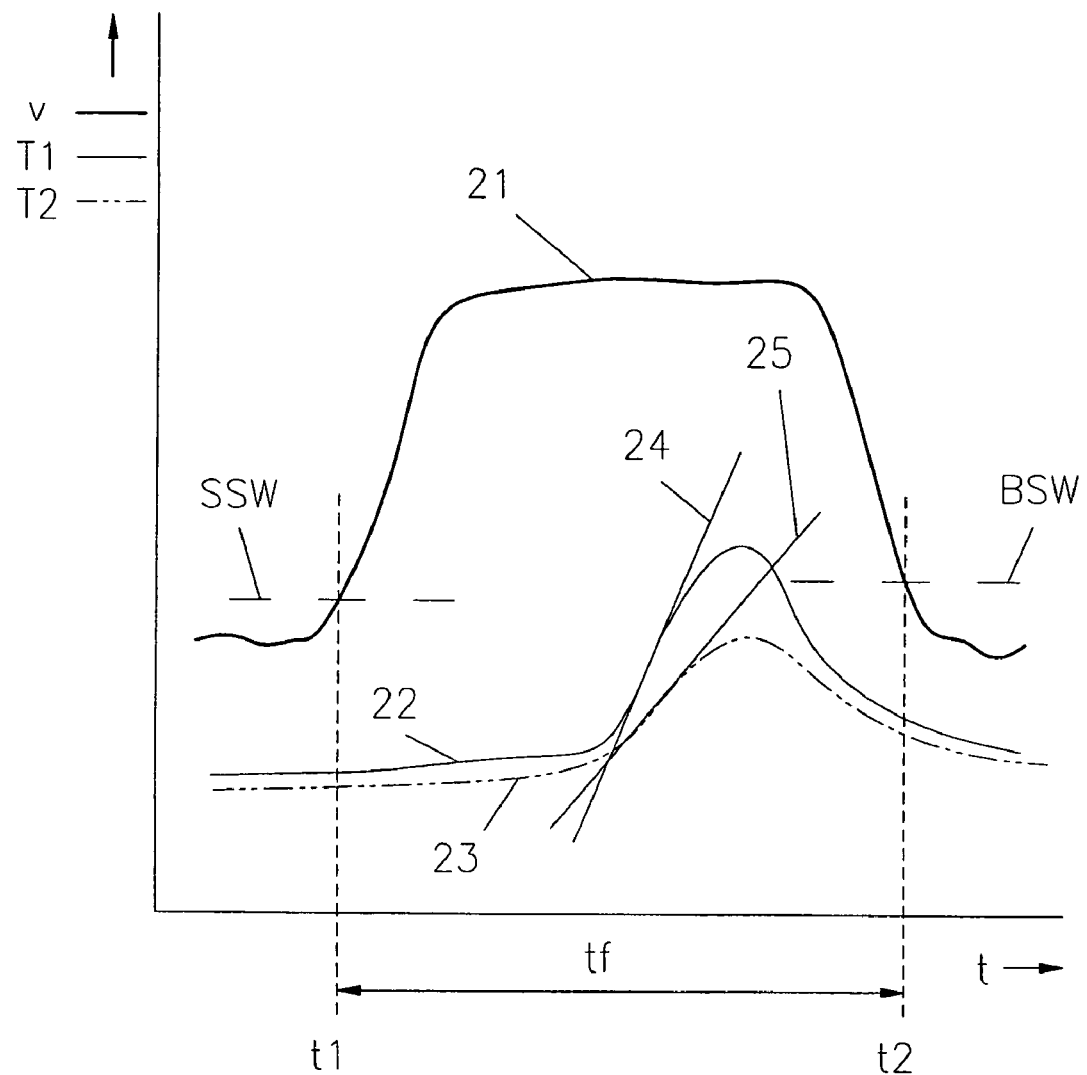
FIG. 1 is a schematic graph that depicts time variation of operationally relevant parameters of a motor vehicle during operation.

Unless stated otherwise, identical or functionally identical parts and/or assemblies have the same reference symbols in all of the figures of the drawing.

In FIG. 1, various profiles of operationally relevant parameters of a motor vehicle are schematically illustrated against a time axis t. Reference symbol 21 denotes vehicle speed which is illustrated with a double-thick line. At a first time t1 the speed rises above a threshold value SSW, and runs relatively constantly within a time window tf until it falls to values below the threshold value S at time t2. (This profile represents, for example, a specific operating state of a motor vehicle, such as a relatively long motorway journey.)

On account of the relatively high traveling speed, the operating temperature of the vehicle engine of a type generally shown in FIG. 1 of U.S. Pat. No. 6,695,473, incorporated by reference herein (and therefore also the temperature of its heat-exchanger medium, such as cooling water) increases, the profile of said temperature of its heat-exchanger medium being denoted by reference symbol 22 with a solid line. Due to operation of the engine, this first temperature 22 of the heat-exchanger medium increases in a known manner, with a delay within the time window tf, which can be seen from the distance to the first time t1 on the time axis t. This rise in temperature has a gradient which is relevant for the operating state and is illustrated by a straight gradient line 24 which forms a so-called temperature gradient over time.

This temperature gradient is characterized by a specific operating state of the motor vehicle. This operating state can be described in the time window tf by specific operationally relevant parameters, for example vehicle speed v in km/h, rotational speed n of the engine in revolutions/min, exhaust-gas quantity in Δ mass/time, etc. For reasons of clarity, only the vehicle speed is shown in FIG. 1.

Specific operating states can therefore be identified on the basis of the known parameter values and associated expected temperature gradients of the heat-exchanger medium can be determined. For example, it is possible to predict the expected rise in temperature of the heat-exchanger medium by means of the exhaust-gas quantity and its temperature.

This temperature gradient is also a function of the location (in the cooling circuit of the vehicle engine) at which the heat-exchanger temperature is measured, in particular by where and how an associated measuring device is installed. The heat-transfer processes, which occur in this regard, with different heat-transfer resistances, are known and do not need to be explained.

This is illustrated by the profile of a temperature 23 of a second heat-exchanger medium, with the associated measuring device being fitted, for example, on the outside of a coolant tube. In this case, the temperature increases, after a delay, with a second straight gradient line 25 in the same time window tf in the same operating state as in the first temperature 22 of the heat-exchanger medium. As can be seen, the second straight gradient line 25 has a temperature gradient which differs from that of the first straight gradient line 24, in this case with a lower value.

The method according to the invention will now be described with reference to FIG. 1.

At time t1, engine temperature first exceeds 85° C., for example, which is treated as an entry criterion. If at least one specific operationally relevant parameters exceeds a predefined threshold value SSW depending on a specific operating state, the time window tf is started in a first method step S1.

The operationally relevant parameters and the temperature of the heat-exchanger medium are observed within the time window tf in a subsequent method step S2. That is, their values are measured and stored at predefined time intervals, so that the value profile is recorded, for example in a memory device of an associated evaluation unit or in the on-board computer.

After the value falls below the same or a further predefined threshold value BSW (or after a specific time elapses, this time being controlled, for example, by a timer which is started simultaneously at time t1), the time window tf is ended in a method step S3 at the second time t2.

In a subsequent method step S4, the observed operationally relevant parameters allow an operating state to be determined and therefore a temperature gradient which is expected in this operating state to be detected. In a further method step S6, the temperature gradient which is obtained in this way is compared with the current temperature gradient which is detected from the recorded values of the temperature of the heat-exchanger medium in a method step S5.

This comparison provides a conclusion about the location at which the values of the current temperature gradient have been measured. If the value or the value range of the current temperature gradient matches that of the expected temperature gradient, a suitable heat-exchanger, for example, is present. If the value range of the current temperature gradient is less than or greater than that of the expected temperature gradient, either the installed heat-exchanger is not suitable or a manipulated heat-exchanger system is present. The current temperature gradient can be higher, for example in a manipulated cooling system, if it is heated in a manipulative manner in order to obtain higher temperature gradients. However, the other criteria cannot be maintained in this case, as a result of which detection is nevertheless possible.

In order to check the plausibility of these detection values, this method is repeated more than once in a further embodiment of the invention, and a counter is incremented for each detected comparison value up to a predefined value with each run through the method.

The result of the detection is transmitted to the on-board computer for further processing or indication purposes, for example by means of a data bus inside the vehicle. Special indicators or measures can be initiated when a manipulation has occurred.

Figure 2:
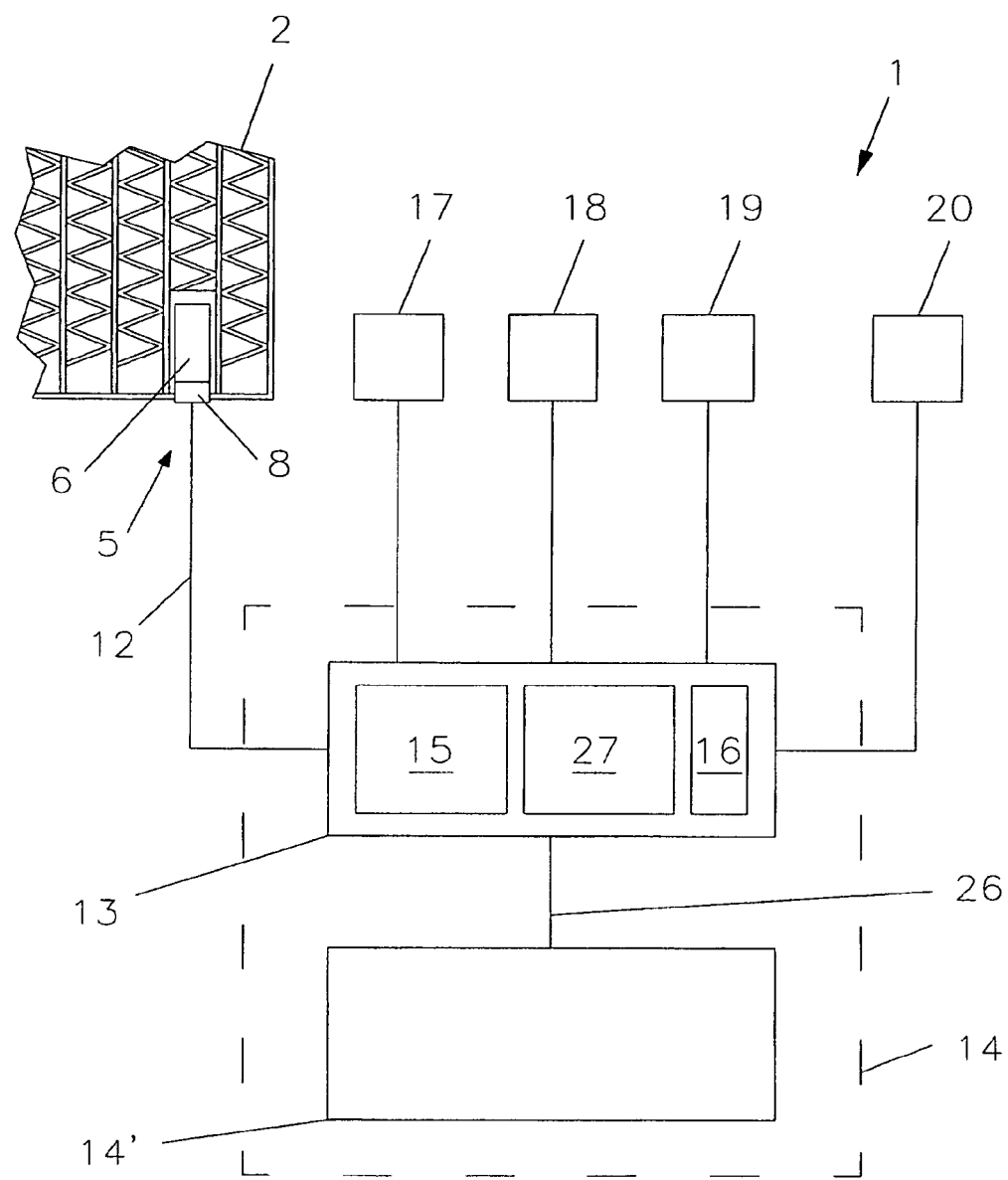
FIG. 2 is a schematic block diagram of a representative embodiment of the inventive apparatus.

FIG. 2 is a schematic block diagram of an exemplary embodiment of the apparatus for carrying out the inventive method according to the invention.

The apparatus 1 comprises an evaluation unit 13 to which a measuring device 5 for measuring the temperature of a heat-exchanger medium in a heat exchanger 2 is connected by means of a connection device 8 and a line 12.

Further detection units 17, 18, 19, 20 for operationally relevant parameters, for example rotational speed 17 of the engine, engine temperature 18, exhaust-gas quantity 19, vehicle speed 20, are connected to the evaluation unit 13. The detection units 17, 18, 19, 20 and the like can also be connected to an on-board computer 14' which is connected to the evaluation unit 13 by means of a data-transmission means 26 and therefore supplies the required data values.

The evaluation unit 13 has at least one memory device 15 and at least one counter 16. (It may also be provided with a timer, not illustrated). The memory device 15 is used, inter alia, to store recorded measured values; and the counter 16 is an event counter.

The evaluation device 13 also has a data memory 27 which contains predefined table values, threshold values and the like which are used to determine the operating states and expected values.

The evaluation unit 13 may be a constituent part of an on-board computer 14 having a conventional type of processor 14', as is indicated symbolically by a double dot-and-dash line.

Figure 3:
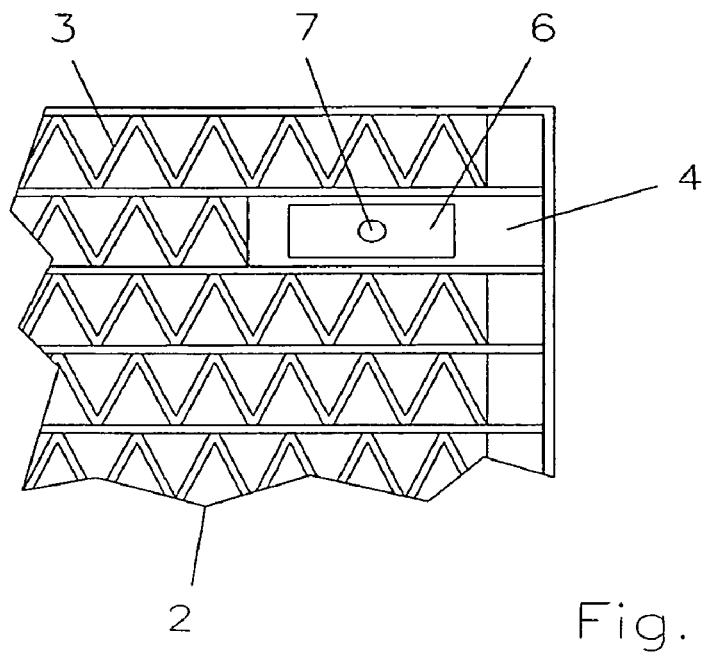
FIG. 3 is a schematic view of a holding element according to the invention, installed in a radiator.

The measuring device 5 has a holding element 6 with a holder 7 for holding a temperature sensor 10, as illustrated in FIG. 3. The holding element 6 is designed such that it is installed in the heat exchanger 2, for example in an intermediate space 4 between lamellae 3. The holding element 6 is preferably stuck in in such a way that it damages the heat exchanger 2 when an attempt is made to remove it. Other fastening options are also feasible.

Figure 4:
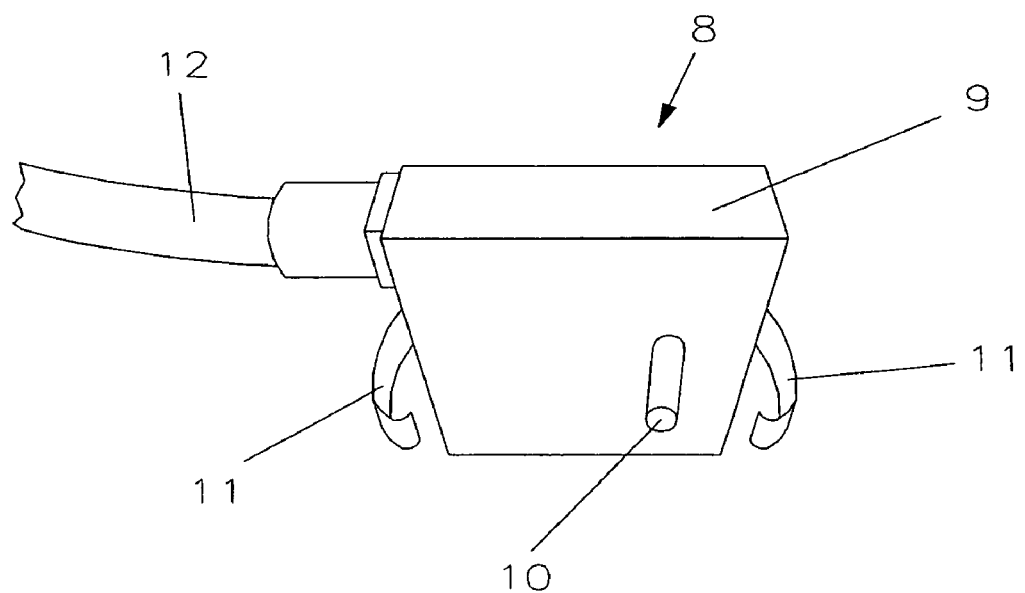
FIG. 4 is a schematic perspective view of a connection device according to the invention.

The temperature sensor 10 is located in an adapter 9 of the connection device 8, as shown in FIG. 4. The temperature sensor 10 and the holder 7 of the holding element 6 are of corresponding shape and dimensions.

The adapter 9 is equipped with fastening elements 11 (for example flexible retaining fingers with barbed hooks), which, together with corresponding fastening elements (not illustrated) on the holding element 6, form a connection which cannot be released following assembly. Improper removal is therefore effectively prevented.

In addition, in one embodiment, the temperature sensor 10 is adhesively bonded in the holder 7 of the holding element 6 such that it is rendered inoperable for example by means of a predetermined breaking point, when an attempt is made to remove it.

Although the present invention has been described with reference to preferred exemplary embodiments above, it is not restricted to these but can be modified in a variety of ways. For example, it is feasible for the memory device 15, the counter 16 and a timer to be constituent parts of the on-board computer. It is also feasible for the inventive method to be used for the advance detection of functional faults in heat-exchanger systems. Finally, the data memory 27 may also have wireless connecting devices to external data memories, for example via satellite connection. It may also be a CD-ROM or DVD device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for detecting presence or absence of a motor vehicle prescribed heat exchanger during motor vehicle operation, comprising:
   (S1) using a sensor to measure temperature of a heat-exchanger medium and at the same time observing further current motor vehicle operationally relevant parameters for a given time window;
   (S2) determining an expected time gradient of the temperature of the heat-exchanger medium;
   (S3) determining a current time gradient of the temperature of the heat-exchanger medium; and
   (S4) using an evaluation device to detect the presence of a prescribed heat exchanger based on the expected and the current time gradients of the temperature of the heat-exchanger medium;
   wherein method step (S1) comprises the following substeps:
   (S1-1) measuring values of the temperature of the heat-exchanger medium in predefined time intervals and plotting time profiles of the temperature values; and
   (S1-2) measuring values of the operationally relevant parameters at predefined time intervals and plotting time profiles of the operationally relevant parameters values; and
   wherein method step ($2) comprises the following substeps:
   (S2-1) comparing the plotted current operationally relevant parameters with predefined values;
   (S2-2) determining an associated current operating state in accordance with this comparison; and
   (S2-3) determining the temperature gradient expected in the associated current operating state.

2. A method for detecting presence or absence of a motor vehicle prescribed heat exchanger, comprising the following steps which are performed during motor vehicle operation:
   (S1) observing, using a sensor, temperature of a heat-exchanger medium and at the same time observing further current motor vehicle operationally relevant parameters for a given time window;
   (S2) determining an expected time gradient of the temperature of the heat-exchanger medium;
   (S3) determining a current time gradient of the temperature of the heat-exchanger medium; and
   (S4) detecting, using an evaluation device, the presence of a prescribed heat exchanger based on the expected and the current time gradients of the temperature of the heat-exchanger medium,
   wherein method step (S4) comprises the following substeps:
   (S4-1) comparing the current and expected time gradients of the temperature of the heat-exchanger medium;
   (S4-2) taking into account this comparison result with reference to a predefined threshold value;
   (S4-3) incrementing at least one counter in accordance with the comparison result from substep (S4-2);
   (S4-4) carrying out method steps (S1) to (S4) until a predefined counter reading is reached; and
   (S4-5) outputting data signals when the presence of a prescribed heat exchanger is detected.

3. An apparatus for detecting the presence of a motor vehicle prescribed heat exchanger, comprising:
   a heat-exchanger medium for a-the motor vehicle motor prescribed heat exchanger;
   a measuring system for measuring the temperature of the heat-exchanger medium;
   an evaluation device for evaluating data for detecting the presence of the prescribed heat exchanger having:
   a memory device for storing values of time profiles of measured values;
   a data memory for storing data including predefined threshold values and operating state data; and
   at least one counter,
   wherein the apparatus is configured to measure the temperature of the heat-exchanger medium with the measuring system and at the same time observe further current motor vehicle operationally relevant parameters for a given time window in which the measuring system measures values of the temperature of the heat-exchanger medium in predefined time intervals and the time profiles of the temperature values are plotted and stored in the memory device and values of the operationally relevant parameters are measured at predefined time intervals and time profiles of the values of the operationally relevant parameters are plotted; to determine an expected time gradient of the temperature of the heat-exchanger medium, in which the plotted current operationally relevant parameters are compared with the predefined threshold values stored in the data memory, an associated current operating state is determined in accordance with the compared parameter, and the temperature gradient expected in the associated current operating state is determined; to determine a current time gradient of the temperature of the heat-exchanger medium; and to detect the presence of a prescribed heat exchanger based on the expected and the current time gradients of the temperature of the heat-exchanger medium on a repeated basis using the at least one counter of the evaluation device.

4. The apparatus as claimed in claim 3, wherein the evaluation device is a constituent part of a motor vehicle on-board computer.

* * * * *